United States Patent
Sturt et al.

(10) Patent No.: US 7,258,381 B2
(45) Date of Patent: Aug. 21, 2007

(54) MODULAR VEHICLE INTERIOR COMPONENT SYSTEM AND RELEASE LATCH MECHANISM FOR USE WITH THE SYSTEM

(75) Inventors: Alan Sturt, West Bloomfield, MI (US); James A. Mulvihill, Berkley, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 86 days.

(21) Appl. No.: 10/908,700

(22) Filed: May 23, 2005

(65) Prior Publication Data

US 2006/0261621 A1 Nov. 23, 2006

(51) Int. Cl.
*B60R 7/04* (2006.01)
(52) U.S. Cl. .................. 296/24.34; 296/37.8; 296/37.7
(58) Field of Classification Search ............. 296/24.34, 296/37.8, 37.14, 37.7
See application file for complete search history.

(56) References Cited

U.S. PATENT DOCUMENTS

| | | | |
|---|---|---|---|
| 5,077,736 A | 12/1991 | Dunphy, Jr. et al. | |
| 5,124,987 A | 6/1992 | Milligan et al. | |
| 5,410,667 A | 4/1995 | Belsan et al. | |
| 6,367,857 B2 | 4/2002 | Kifer et al. | |
| 6,497,443 B2 | 12/2002 | Worrell et al. | |
| 6,572,169 B2 * | 6/2003 | Panhelleux et al. | 296/24.34 |
| 6,921,118 B2 * | 7/2005 | Clark et al. | 296/24.34 |
| 2001/0030435 A1 | 10/2001 | Burns et al. | |
| 2002/0175531 A1 | 11/2002 | Worrell et al. | |
| 2003/0122392 A1 | 7/2003 | Larsen et al. | |
| 2005/0242604 A1 * | 11/2005 | Bonnes et al. | 296/35.1 |

FOREIGN PATENT DOCUMENTS

JP 10-329612 * 12/1998

* cited by examiner

*Primary Examiner*—Dennis H. Pedder
(74) *Attorney, Agent, or Firm*—Brooks Kushman P.C.

(57) ABSTRACT

In at least one embodiment, the present invention relates to a modular vehicle interior component system which comprises a base having a channel defined at least in part by a latching lip, a vehicle interior component, and a release latch mechanism for slidably and releasably securing the component to the base.

17 Claims, 5 Drawing Sheets

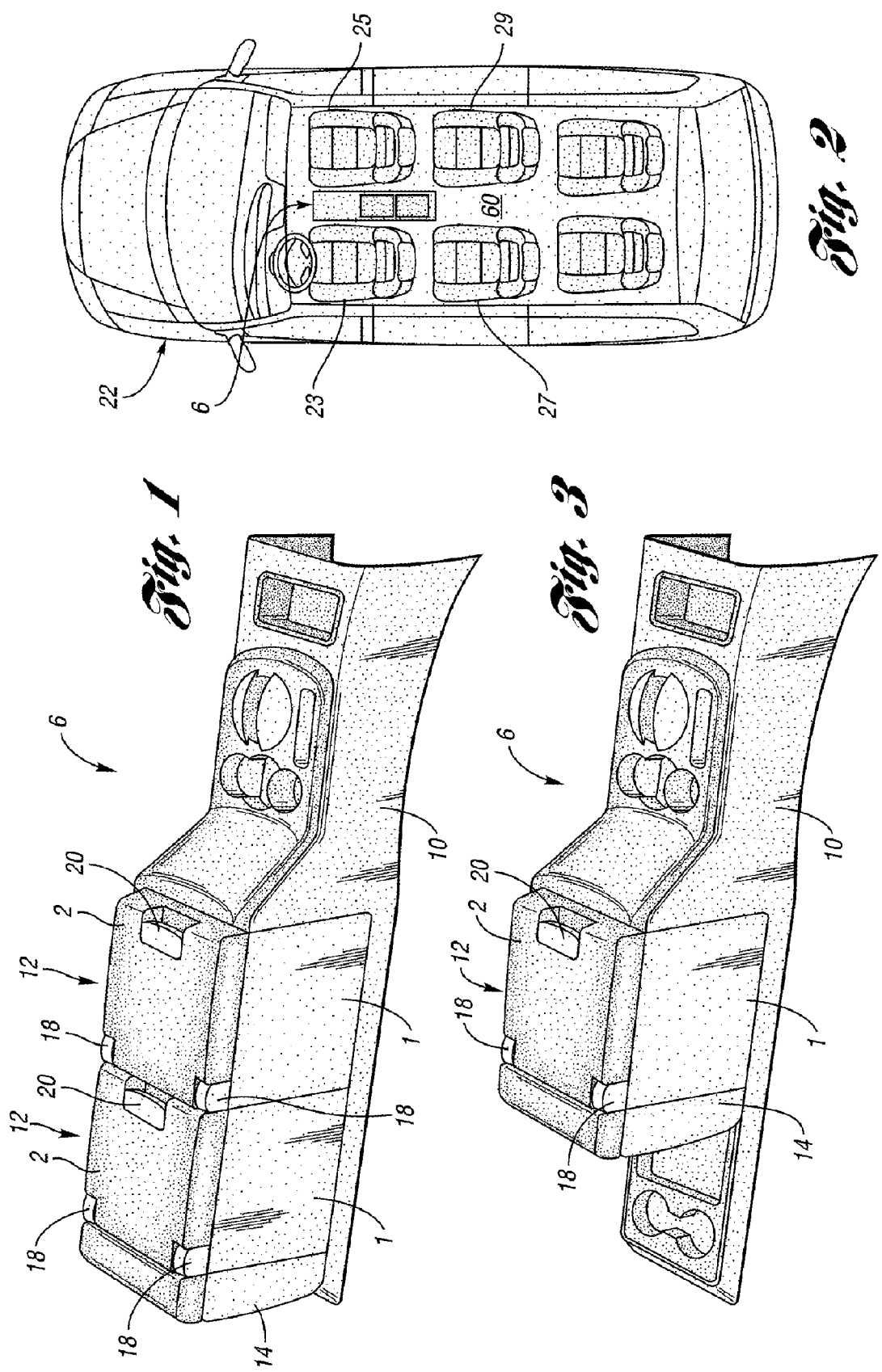

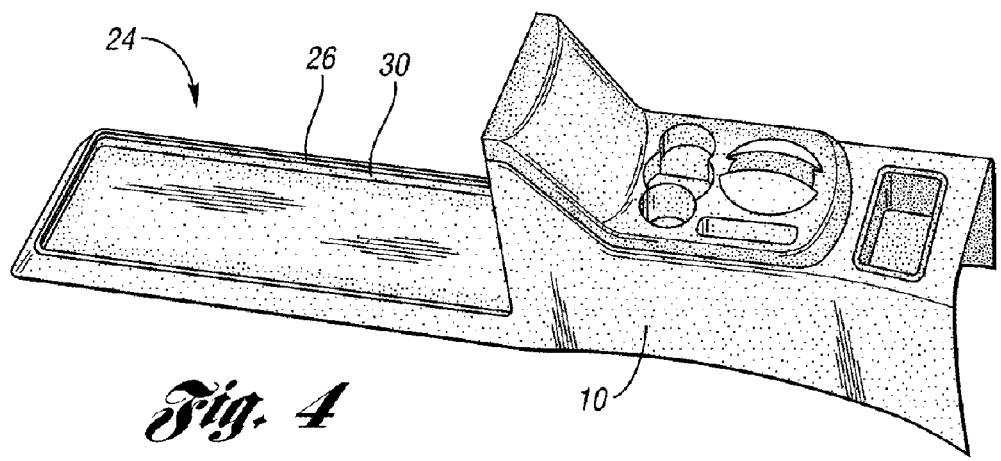
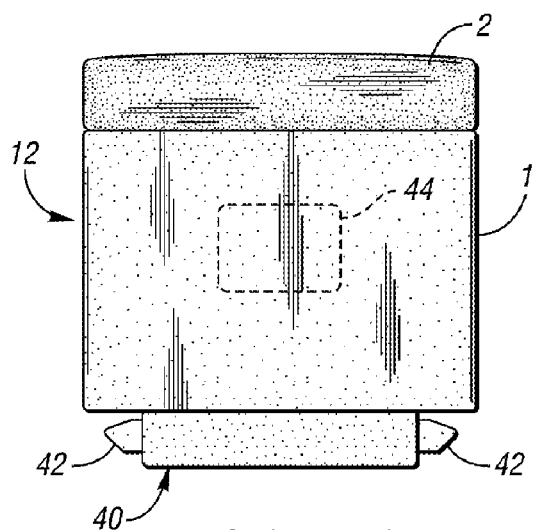
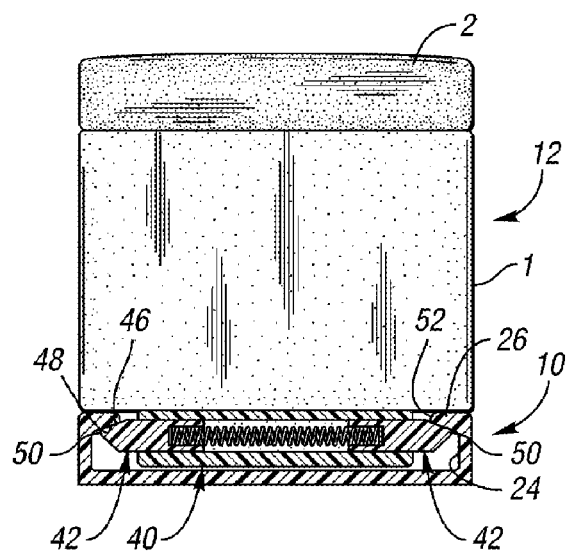
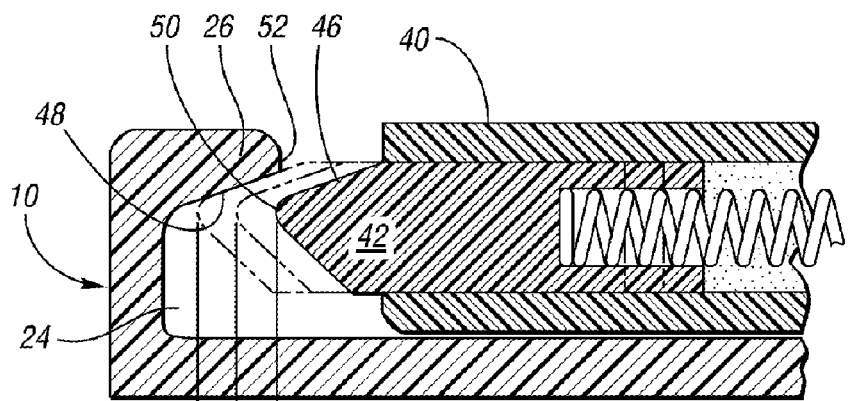

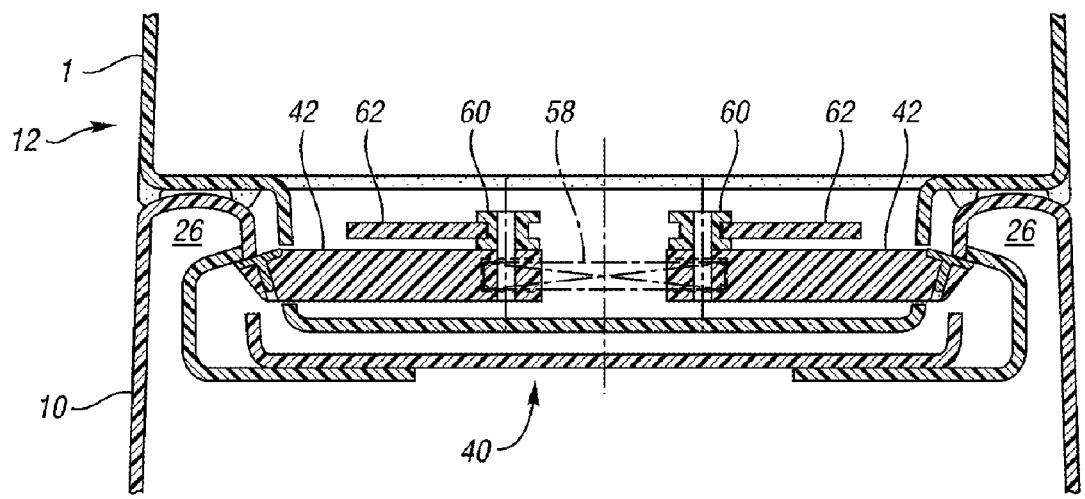
*Fig. 13*
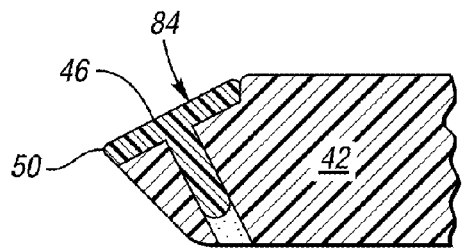
*Fig. 14*
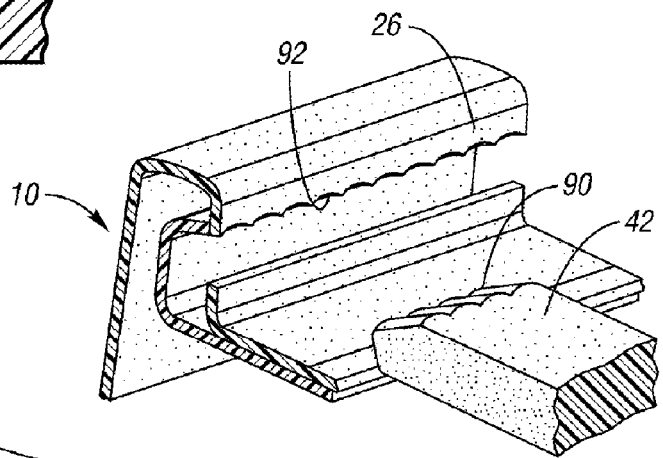
*Fig. 15*
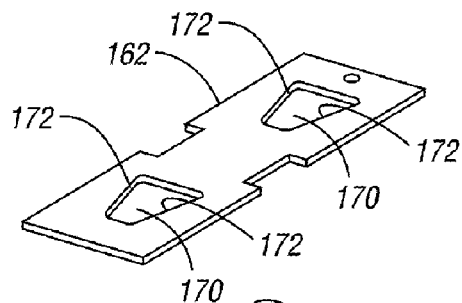
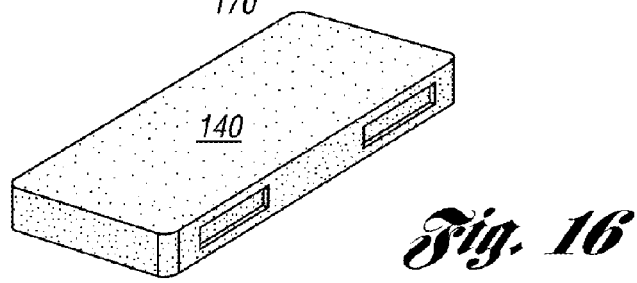
*Fig. 16*

MODULAR VEHICLE INTERIOR COMPONENT SYSTEM AND RELEASE LATCH MECHANISM FOR USE WITH THE SYSTEM

BACKGROUND OF THE INVENTION

1. Field of the Invention

The present invention relates to modular vehicle interior component systems and release latch mechanisms for use with such systems.

2. Background Art

Vehicles today are increasing designed to carry a wide variety of cargo. In addition to carrying large items which may be stored in a rearward portion of the vehicle, passenger compartments are also configured to carry, and provide access to, a wide variety of accessories and components, including entertainment devices and area-specific environmental controls. In addition, vehicle consoles often provide empty space that can be used to store a variety of different items.

One limitation of many of these designs is that the vehicle console is a static structure—i.e., the vehicle occupant must accept the configuration of the console, and cannot tailor it to his or her specific needs. Attempts to address this issue include the development of reconfigurable consoles for vehicles.

There exists a need for a modular vehicle interior component system where in the components can be selectively positioned as desired by the vehicle occupant at any location along the base.

SUMMARY OF THE INVENTION

According to at least one embodiment of the present invention, a modular vehicle interior component system is provided. In at least one embodiment, the system comprises a base having a channel, with the channel being defined at least in part by a latching lip, a vehicle interior component, and a release latch mechanism for slidably and releasably securing the component to the base.

In a further embodiment, the component comprises a storage unit comprising a bin having a hinged lid mounted thereon.

In yet a further embodiment, the latch mechanism includes two opposed latch blocks that are movable from a first position to at least a second position, with the latch blocks engaging the latching lip for securing the component to the base in a first position, and the latch blocks remain within the channel while disengaged from the latching lip to enable the latch mechanism to slide along the first direction within the channel when in the second position.

In still yet another embodiment, the latch blocks are movable to a third position, wherein the latch blocks are disengaged from the latching lip to enable the component to move in a second direction substantially transverse the first direction to enable the component to be removed from the base.

In still yet another embodiment, the latch mechanism includes an actuator plate that communicates with a release handle with the actuator plate being able to move the latch blocks from the first position towards at least the second position in response to movement of the release handle. In at least one embodiment, this movement is away from the latch mechanism.

In still yet another embodiment, the actuator plate includes an actuator opening defined at least in part by opposed inclined surfaces, wherein the inclined surfaces are engageable with the latch blocks to effect movement of the latch blocks from the first position.

In still yet another embodiment, each of the latch blocks includes a spool engageable with a respective inclined surface to effect the movement of the blocks.

In still yet another embodiment, at least one of the latch blocks includes an angled engagement surface that engages the latching lip when the blocks are in the first position.

According to another embodiment of the present invention, the modular vehicle interior component system comprises a base having a channel, wherein the base is defined at least in part by a latching lip, a storage unit comprising a bin having a hinged lid mounted thereon, and a release latch mechanism for slidably and releasably securing the component to the base, wherein the latch mechanism includes at least one latch block that is movable from a first position to a second position, wherein when in the first position, the latch block engages the latching lip for securing the storage unit to the base and when in the second position the latch block remains within the channel while disengaged from the latching lip to enable the latch mechanism to slide along a first direction within the channel.

In at least yet another embodiment, the present invention relates to a release latch mechanism for slidably and releasably securing a component to a base having a channel defined at least in part by a latching lip. In at least one embodiment, the release latch mechanism comprises two opposed latch blocks that are movable from a first position to a second position. When in the first position, the latch blocks engage the latching lip for securing the component to the base and when in the second position the latch blocks remain within the channel while disengaged from the latching lip to enable the latch mechanism to slide along a first direction within the channel. The release latch mechanism of this embodiment further includes an actuator plate that communicates with a release handle, wherein the actuator plate can move the latch blocks from the first position towards at least the second position in response to movement of the release handle away from the latch mechanism, wherein the actuator plate includes an actuator opening defined at least in part by opposed inclined surfaces, the inclined surfaces engageable with the latch blocks to effect movement of the latch blocks from the first position.

These and other aspects of the present invention will be readily understood by one of ordinary skill in the art in view of the attached drawings and following detailed description of the preferred embodiments of the present invention.

BRIEF DESCRIPTION OF THE DRAWINGS

FIG. 1 is a perspective view of a vehicle console, where the storage units are mounted in a console base unit;

FIG. 2 is a top view of a portion of a vehicle compartment including a vehicle console;

FIG. 3 is a perspective view of a vehicle console having a single storage unit mounted in the console base unit;

FIG. 4 is a perspective view of a portion of the vehicle console unit shown in FIGS. 1 and 3;

FIG. 5 is a side view of a storage unit and latch mechanism made in accordance with at least one embodiment of the present invention;

FIG. 6 is a side view of a storage unit mounted to a console base unit via a latch mechanism in accordance with at least one embodiment of the present invention;

FIG. 7 is view of a portion of the latch mechanism and the console base unit of FIG. 6 showing a component of the latch mechanism in different positions;

FIG. 13 is a side view of portions of a storage bin, console base unit, and a latch mechanism made in accordance with an embodiment of the present invention;

FIG. 14 is a portion of a component of a latch mechanism;

FIG. 15 illustrates an embodiment of the latch mechanism and a console base unit; and FIG. 16 illustrates a exploded view of a latch mechanism made in accordance with an embodiment of the present invention.

DETAILED DESCRIPTION OF THE PREFERRED EMBODIMENT(S)

Figure 8:
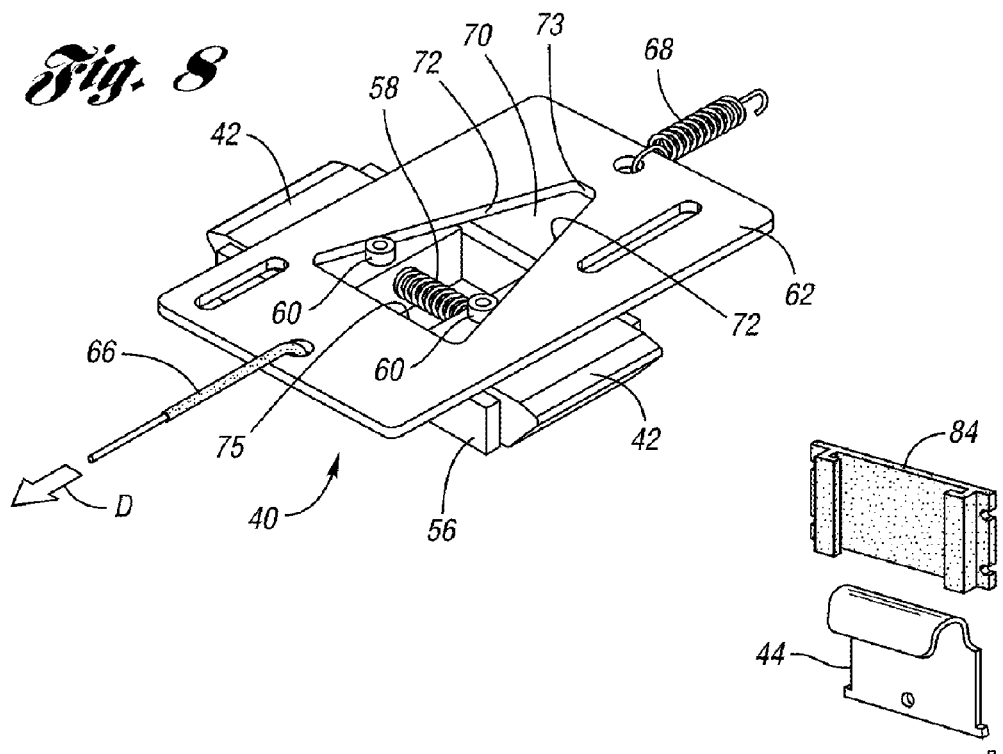
FIG. 8 is a perspective view of an embodiment of the latch mechanism of the present invention.

As required, detailed embodiments of the present invention are disclosed herein. However, it is to be understood that the disclosed embodiments are merely exemplary of the invention that may be embodied in various alternative forms. The figures are not necessarily to scale, some features may be exaggerated or minimized to show details of particular components. Therefore, specific structural or functional details disclosed herein are not to be interpreted as limiting, but merely as a representative basis for the claims and/or a representative basis for teaching one skilled in the art to variously employ the present invention.

Referring to FIG. 1 there is shown a perspective view of a vehicle console 6. In the embodiment illustrated in FIG. 1, the vehicle console 6 includes a console base unit 10 into which a plurality of vehicle interior components, such as storage units 12, and an end storage unit 14 may be selectively detachably mounted. While a vehicle console with selectively detachably mounted components is shown, it should be understood that the principles of the present invention can be applicable to other vehicle interior components, such as overhead consoles and removable units attached to side door panels, rear quarter trim panels and any other interior surface. In the exemplary storage units 12 shown, the storage units 12 include a bin 1 with a lid 2 movably mounted to the bin 1 by a pair of hinges 18, also having a lid latching handle 20.

Referring to FIG. 2, FIG. 2 shows the vehicle console 6 mounted in a vehicle 22. As oriented in the vehicle 22, the vehicle console 6 is intended to be accessible to vehicle occupants seated in either of the first two rows of seats 23, 25 and 27, 29. However, it should be understood that the vehicle console 6 could be mounted in a different orientation. Furthermore, in accordance with the present invention, the arrangement and selection of components in the vehicle console 6 could be modified as desired.

Referring now to FIG. 3 there is shown an alternate embodiment of a vehicle console 6 where only one storage bin 12 and one end storage unit 14 are attached to the console base unit 10. While FIG. 3 shows the storage bin 12 and the end storage unit 14 being mounted at the front portion of the console base unit 10, it is to be understood that the components (bins and storage unit) may also be stored at the rear of the console base unit 10. Such a configuration could allow relatively larger items such as purses and wallets, for example, to be stored safely in the open area between the front of the console base unit 10 and the front of the storage bin 12. It is also to be understood that the storage unit mounting area may be configured to have storage options such as beverage container holders therein which may be used when no storage bin 1 is mounted there over. In another option, for instance, an organizer tray can be removably mounted to the storage unit mounting area to provide these options.

Referring to FIG. 4 there is shown a perspective view of a console base unit 10 in which no storage units 12 or end units 14 are attached. As can be seen in FIG. 4, the console base unit 10 has a cavity 24 generally located at the rear portion of the console base unit 10. In the illustrated embodiments, the cavity 24 of the console 10 includes a latching lip 26 and opposed walls that defines a channel 30.

Referring to FIG. 5, an exemplary storage unit 12 with a latch mechanism 40 made in accordance with at least one embodiment of the present invention is illustrated. The latch mechanism 40 is connected in a suitable manner to the bottom of bin 1. The latch mechanism enables the bin 1 (or other vehicle interior component) to be slidably and releasably secured to the console base unit 10. The latch mechanism 40 illustrated in FIG. 5 includes two selectively movable latch blocks 42 for selectively securing the bin 1 to the console base unit 10 as will be explained further below. As can be seen in FIG. 5, a schematic release handle 44 is provided for selectively moving the latch blocks of the latch mechanism 40.

Referring to FIG. 6, a sectional view of a storage unit 12 secured to the console base unit 10 by a latch mechanism 40 in accordance with at least one embodiment of the present invention is illustrated. The latch blocks 42 are illustrated in FIG. 6 to be in a first position wherein the latch blocks 42 engage the latching lip 26 of the console base unit 10 for securing the storage unit end 12 to the console base unit 10. As can be seen in FIG. 6, the latch blocks 42 have angled surfaces 46 proximate their distal ends 50 which, when in a first position, engage angled surface 48 of the latching lip 26.

Figure 11:
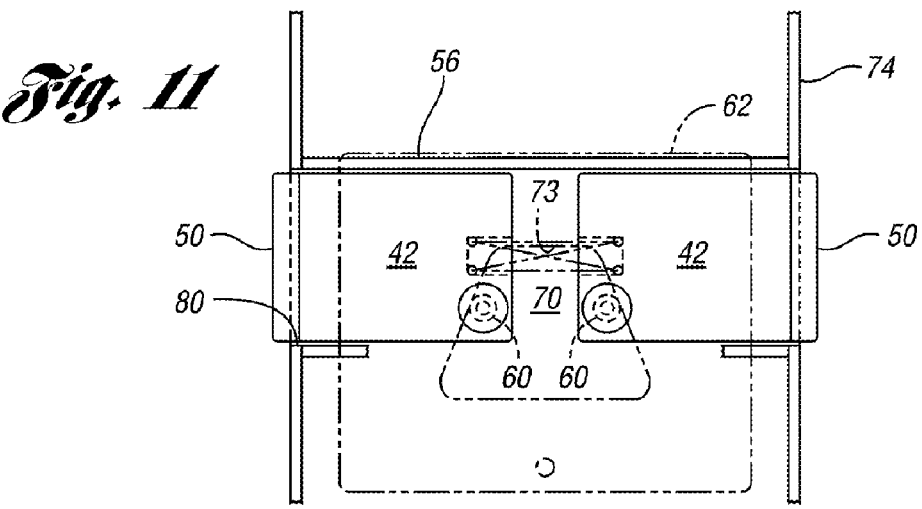
FIG. 11 is similar to FIG. 10 showing parts in a second position.

Referring back to FIG. 7, the latch block 42 is illustrated in phantom in a second position at B. When in B, the angled surfaces 46 of the latch blocks 42 are disengaged from the angled surface 48 of the latching lip 26 to enable the latch mechanism 40 to slide within channel 30 to enable selective positioning of the component attached to latch mechanism 40, such as storage unit 12, along the channel 30 of the console base unit 10. This enables varying the configuration of the console storage components. It should be noted that the distal end 50 of the latching block 42 is past the lip edge 52 when the latch block is in the first and second positions A and B. A top view of the latch mechanism 40 with the latch blocks 42 in the second position is illustrated in FIG. 11.

Figure 12:
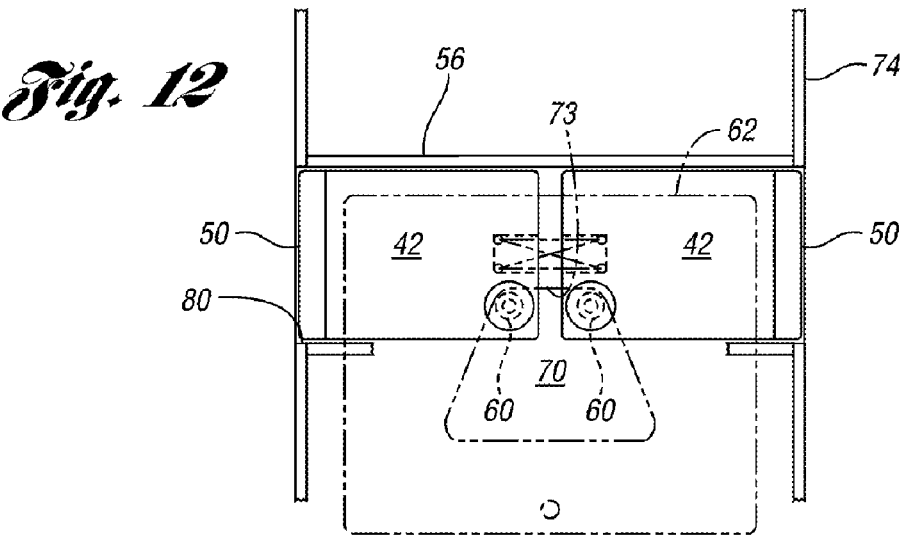
FIG. 12 is similar to FIG. 10 showing parts in a third position.

Referring back to FIG. 7, FIG. 7 also shows the latch blocks 42 in phantom in a third position at C. When in the third position, the latch blocks 42 are retracted sufficiently so that the angled surfaces 46 are disengaged from the angled surface 48 of the console base unit 10 and the distal edges 50 of the latch blocks 42 are before the lip edge 52. A top view of the latch mechanism 40 with the latch blocks 42 in the third position is illustrated in FIG. 12. When in the third position, the latch mechanism 40 is readily removable from the channel 30 by lifting the component attached to the latch mechanism 40 in a direction generally transverse to the channel 30. Thus, when the blocks 42 are in the third position, the component of the latch mechanism 40 is secured to, can be selectively put into or removed from the console base unit 10. This enables varying the configuration of the console storage components as well as other usability components.

Referring to FIG. 8, a perspective view of a latch mechanism 40 made in accordance with at least one embodiment of the present invention is illustrated. The latch blocks 42 are shown to be housed in a guide housing 56. The latch blocks 42 are separated from each other by a biasing member such as a spring 58. The latch blocks 42 each have a protrusion, such as spool 60, that extend upwardly from the upper surface of the latch blocks 42. In at least one embodiment, the spools 60 are rotatable to reduce friction as the blocks move relative to the actuator plate 62. The latch mechanism 40 includes an actuator plate 62 connected with the release handle 44 via a suitable linkage such as a wire or cable 66. A biasing spring 68, or other suitable biasing member, can be provided to bias the actuator plate 62 in a first direction to enable the two blocks 42 to extend in or towards the first position. The actuator plate 62 includes an opening 70 defined at least in part by a pair of opposed inclined surfaces 72. The opposed inclined surfaces 72 are separated by differently sized opposed generally parallel surfaces 73 and 75 to form a generally triangular shape for the opening 70. The parallel surface 73 is smaller than surface 75, such that the surface 75 generally forms the base of the opening 70 while surface 73 generally forms the apex. As the actuator plate 62 is moved in a second direction D, opposite the first position, via actuation by movement of the release handle 44, the inclined surfaces move the spools 60 towards each other thereby retracting the latch blocks 42 to either the second or third positions as desired. By retracting the blocks 42, it is meant to move the blocks towards each other. The retraction occurs generally as the base of the opening (or the surface 75) moves away from the spools 60 in direction D, thereby moving the spools down the inclined surfaces 72.

Figure 9:
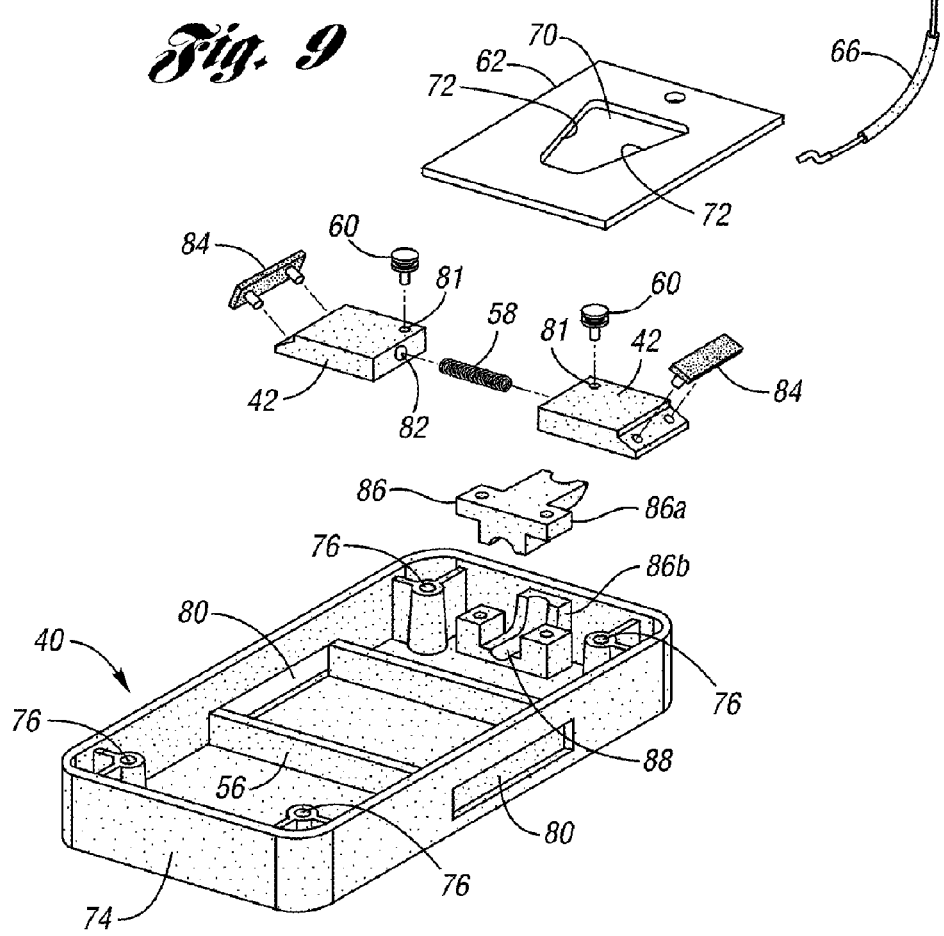
FIG. 9 is an exploded view showing an embodiment of the latch mechanism of the present invention.

Referring to FIG. 9, an exploded view of a latch mechanism 40 made in accordance with at least one embodiment of the present invention is illustrated. The latch mechanism 40 illustrated in FIG. 9 includes a housing 74. The housing 74 includes bosses 76 for attaching the latch mechanism 40 to the vehicle interior component such as storage unit 12. As can be appreciated, screws or other suitable attachment members could be used to secure the housing 74 to the interior vehicle component.

In the illustrated embodiment, housing 74 includes the guide housing 56 and sidewalls of the housing 74 include openings 80 adjacent the housing 56 sidewalls. The housing openings 80 enable the latch blocks 42 to extend there through. In the illustrated embodiment, the latch blocks 42 include openings 81 for receipt of a respective one of the spools 60. Each of the latch blocks 42 may also include an opening 82 for receipt of biasing spring 58 to help urge the blocks 42 in, or at least towards, the first position. In at least one embodiment, the angled surfaces 46 of the latch blocks 42 may be provided with or as brake pads 84. The brake pads 84 may be made of a low durometer material, such as elastomeric material such as rubber to prevent movement of the vehicle interior component, such as storage unit 12, when the blocks 42 of the latch mechanism 40 are in the first position. The actuator plate 62 includes the opening 70 defined at least in part by opposed inclined surfaces 72. The actuator plate 62 is connected to a suitable release handle 44 or other suitable actuator via cable 66 or other suitable connection means. In at least one embodiment, a release handle track 84 is secured to the vehicle interior component, such as unit 12, to guide movement of the release handle 44. The latch mechanism 40 in at least one embodiment includes a cable anchor 86 having a top member 86a and a bottom member 86b which together cooperate to define a cable guide 88 for guiding the cable between the plate 42 and actuator 44.

Figure 10:
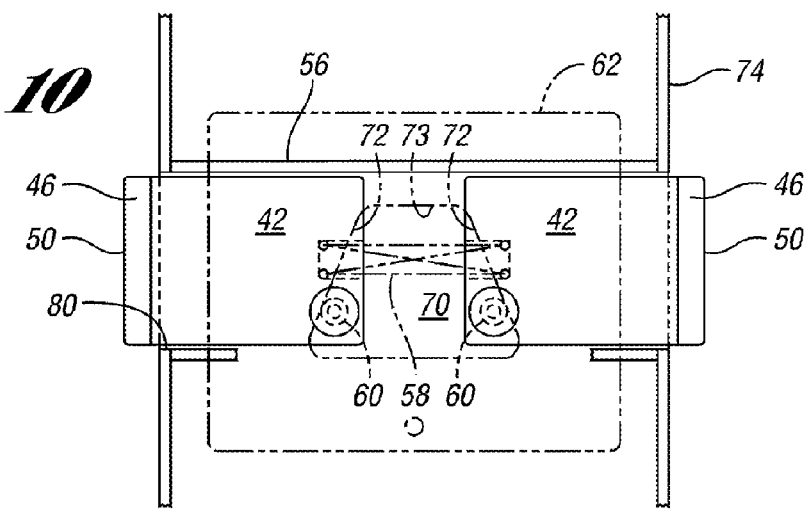
FIG. 10 is a top view showing an embodiment of the latch mechanism in a first position.

Referring again to FIG. 10, the latch blocks 42 of the latch mechanism 40 are shown in the first position. When in the first position, the actuator plate 62 is positioned so the opening 70 allows the blocks 42 to be spaced a first distance from each other.

Referring to FIG. 11, the latch blocks 42 are shown in the second position. When in the second position, the actuator plate 62 is positioned so that the opening 70 allows the blocks 42 to be spaced a second distance, less than the first distance, from each other. In the second position, the surface 75 is further away from the spools 60 and the spools are further down the inclined surfaces 72, than when in the first position.

Referring to FIG. 12, the latch blocks 42 are shown in the third position. When in the third position, the actuator plate 62 is positioned so that the opening 70 allows the blocks 42 to be spaced in a third distance, less than the second distance, from each other. In the third position, the surface 75 is further away from the spools 60 and the spools are further down the inclined surfaces 72, than when in the second position.

FIG. 13 illustrates a side sectional view of a console base unit 10, a storage unit 12, and a latch mechanism 40 made in accordance with at least one embodiment of the present invention and FIG. 14 illustrated a partial sectional view of the distal end of a latch block 42. In the embodiment illustrated, the block 42 is shown to include a brake pad 84, however, it should be understood that the brake pad could be removed. It should also be understood that the components of the latch mechanisms 40 of the present invention can be made of any suitable material, such as plastic, and by any suitable manufacturing process.

FIG. 15 shows an embodiment where the latch block 42 and the latch lip 26 of the console base unit 10 have opposed inclined surfaces that are shaped to be engageable with each other. For instance, as shown in FIG. 15, the opposed surfaces 90 and 92 are scalloped or tongue and grooved so that they fit within the other to inhibit relative movement.

Referring to FIG. 16, an alternative latch mechanism 140 is illustrated as having an actuator plate 162 having two sets of openings 170 providing two sets of inclined surfaces 172 to operate two sets of latch blocks (not shown). As can be readily contemplated, the latch mechanism 140 could have a second set of latch blocks and associated springs and guides to enable simultaneous operation of two sets of latch blocks. As can be readily understood, two sets of latch blocks could provide better holding ability and could be used for relatively larger and/or heavier components.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A modular vehicle interior component system comprising:
    a base having a channel, the channel being defined at least in part by a latching lip and opposed walls adjacent to the latching lip;

a vehicle interior component; and a release latch mechanism for slidably and releasably securing the component to the base, the release latch mechanism including a plurality of opposed latch blocks, the latch blocks being positionable within the channel between the opposed walls.

2. The modular vehicle interior component system of claim 1, wherein the component comprises a storage unit comprising a bin having a hinged lid mounted thereon.

3. The modular vehicle interior component system of claim 1, wherein the plurality of opposed latch blocks includes two opposed latch blocks that are movable from a first position, wherein the latch blocks engage the latching lip for securing the component to the base, to a second position, wherein the latch blocks remain within the channel but disengaged from the latching lip to enable the latch mechanism to slide along a first direction within the channel.

4. The modular vehicle interior component system of claim 3, wherein the latch blocks are movable to a third position, wherein the latch blocks are disengaged from the latching lip to enable the component to move in a second direction substantially transverse the first direction to enable the component to be removed from the base.

5. The modular vehicle interior component system of claim 3, wherein the latch mechanism includes an actuator plate that communicates with a release handle, the actuator plate moving the latch blocks from the first position towards at least the second position in response to movement of the release handle.

6. The modular vehicle interior component system of claim 5, wherein the release handle is mounted on the component and is movable in a second direction which is substantially transverse to the channel.

7. A modular vehicle interior component system comprising:
a base having a channel, the channel being defined at least in part by a latching lip;
a vehicle interior component; and
a release latch mechanism for slidably and releasably securing the component to the base, the latch mechanism including two opposed latch blocks that are movable from a first position wherein the latch blocks engage the latching lip for securing the component to the base, to a second position, wherein the latch blocks remain within the channel but disengaged from the latching lip to enable the latch mechanism to slide along a first direction within the channel, the latch mechanism further including an actuator plate that communicates with a release handle, the actuator plate moving the latch blocks from the first position towards at least the second position in response to movement of the release handle, wherein the actuator plate includes an actuator opening defined at least in part by opposed inclined surfaces, the inclined surfaces engageable with the latch blocks to effect movement of the latch blocks from the first position.

8. The modular vehicle interior component system of claim 7, wherein each latch block includes a spool engageable with a respective inclined surface to effect the movement of the blocks.

9. The modular vehicle interior component system of claim 8, wherein the spool is rotatable.

10. The modular vehicle interior component system of claim 3, wherein at least one of the latch blocks includes an angled engagement surface having a low durometer material that engages the latching lip when the blocks are in the first position.

11. The modular vehicle interior component system of claim 10, wherein the angled engagement surfaces and the latching lip each include opposed interlocking surfaces to hinder relative sliding movement of the at least one of the blocks and the latching lip.

12. The modular vehicle interior component system of claim 2, further comprising a second bin having a hinged lid mounted thereon, and a second release latch mechanism for slidably and releasably securing the second bin to the base.

13. The modular vehicle interior component system of claim 3, wherein the plurality of opposed latch blocks includes a third and a fourth latch block movable from the first position to at least the second position.

14. A modular vehicle interior component system comprising:
a base having a channel, the channel being defined at least in part by a latching lip;
a storage unit comprising a bin having a hinged lid mounted thereon; and
a release latch mechanism for slidably and releasably securing the component to the base, the latch mechanism including at least two latch blocks that are movable from a first position, wherein a first end of each of the latch blocks engages the latching lip for securing the storage unit to the base, to a second position, wherein the latch blocks remain within the channel but disengaged from the latching lip to enable the latch mechanism to slide along the first direction within the channel, and a second end of each of the latch blocks communicating with an actuator plate, the actuator plate including an actuator opening defined by at least one surface engageable with the second ends of the latch blocks to effect movement of the latch blocks from the first position.

15. The modular vehicle interior component system of claim 14, wherein the latch blocks are movable to a third position, wherein the latch blocks are disengaged from the latching lip to enable the storage unit to move in a second direction substantially transverse the first direction to enable the storage unit to be removed from the base.

16. The modular vehicle interior component system of claim 1, wherein the vehicle interior component is an overhead console.

17. A modular vehicle interior component system comprising:
a base forming a channel defined at least in part by a latching lip;
a vehicle interior component; and
a release latch mechanism for slidably and releasably securing the component within the channel, the latch mechanism including two opposed latch blocks that are movable from a first position wherein the latch blocks engage the latching lip for securing the component within the channel, to a second position, wherein the latch blocks remain within the channel but disengaged from the latching lip to enable the latch mechanism to slide along a first direction within the channel, wherein the latch mechanism includes an actuator plate that communicates with an actuator, the actuator plate moving the latch blocks from the first position towards the second position in response to movement of the actuator, wherein the actuator plate includes an actuator opening engageable with the latch blocks to effect the movement of the latch blocks from the first position.

* * * * *